United States Patent Office 3,186,809
Patented June 1, 1965

3,186,809
EXTRACTION OF MINERAL ACIDS USING DODECYLPHENOL
Maurice M. Kreevoy and Le Roy T. Ditsch, both of Minneapolis, Minn., assignors to General Mills, Inc., a corporation of Delaware
No Drawing. Filed Aug. 10, 1961, Ser. No. 130,488
8 Claims. (Cl. 23—312)

This invention relates to the amine extraction of mineral acids, and in particular, to the use of dodecylphenol as a synergistic additive in the amine extraction of inorganic mineral acids.

Inorganic mineral acids have been extracted with the use of amine extractants in a water immiscible phase. It has now been discovered that the addition of dodecylphenol to the water immiscible phase containing the amine extractant will increase the amount of mineral acids extracted by the amine. The use of the dodecylphenol provides a synergistic effect in the extraction of the mineral acids. It is therefore an object of this invention to provide an improved process for the extraction of inorganic mineral acids. It is also an object of this invention to provide a method of extracting mineral acids with the use of a synergistic additive, dodecylphenol. It is further an object of this invention to provide a synergistic effect in the amine extraction of mineral acids by employing dodecylphenol as a synergistic additive.

Briefly, the invention consists in adding to the water immiscible organic extractant phase containing the amine extractant small amounts of dodecylphenol which lends the synergistic effect in the extraction. The aqueous solution of the acid is then contacted with the water immiscible organic phase containing the amine extractant and the synergistic additive. The acid is extracted by the amine from the aqueous solution into the immiscible phase. The acid is then recovered from the organic extract in the conventional manner.

The invention finds application in the extraction of a wide variety of acids, and in particular, sulfuric acid, nitric acid, hydrochloric acid, and perchloric acid.

A wide variety of amine extractants are generally used in such extraction process. Among such amine extractants are tricaprylamine and 1-dinonylamino-2-dodecanol and, in general, secondary or tertiary amines, particularly those containing hydrocarbon groups from approximately 8 to approximately 22 carbon atoms. The amines are generally aliphatic in character although they may be partially aromatic. The aliphatic hydrocarbon groups may be straight-chained, saturated or unsaturated. In place of the straight-chained, aliphatic hydrocarbon group, the amines may contain highly branched aliphatic hydrocarbon groups which are principally derived from olefinic sources. In addition, it is possible to use amines containing one or more branched chained alkyl groups and/or one or more straight chained alkyl groups. Typical amines which may be used for this purpose are the following:

(1) 

in which $R_1$ is an aliphatic hydrocarbon group having a tertiary carbon atom at the point at which it is attached to the nitrogen atom. The substituents attached to this tertiary carbon atom are alkyl groups totaling from 11 to 14 carbon atoms in the three alkyl groups. $R_2$ is a $C_{12}H_{25}$ group. A product of this type is available on the market and is sold as Amberlite LA 2.

(2) 

in which $R_1$ is as above-described and $R_3$ is the group

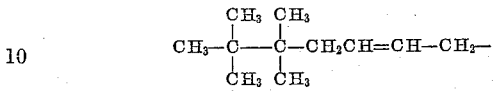

A product of this type is available on the market and is sold as Amberlite LA 1.

(3) The compound bis(1-isobutyl-3,5-dimethylhexyl) amine having the formula

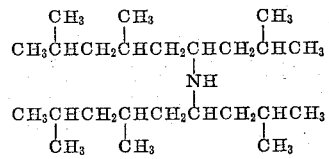

(4) Di(3,5,7-trimethyloctyl)amine having the formula

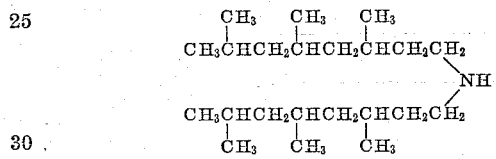

(5) 6-benzylamino-3,9-diethyltridecane having the formula

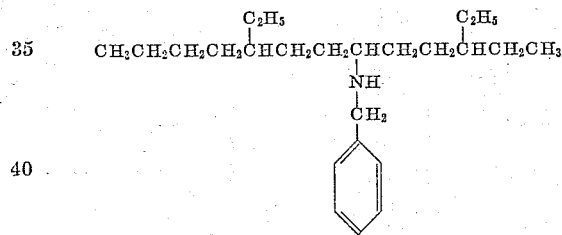

(6) 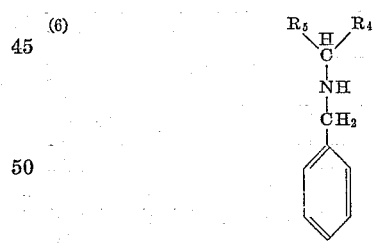

in which $R_4$ and $R_5$ are alkyl groups containing from 7 to 11 carbon atoms.

(7) 

where $R_6$, $R_7$ and $R_8$ are alkyl groups having from 6 to 24 carbon atoms.

The nature of the amine is not critical. However, the amine must be oil soluble and both the amine and its salts must be water insoluble as it is employed in a water immiscible organic phase. In general, the total carbon content of the amine may vary from about 22 to 60 carbon atoms in which at least one chain contains a range from 6 to 24 carbon atoms.

The amine is generally employed in an immiscible phase which is usually a hydrocarbon such as kerosene but may be an aromatic, naphthenic or aliphatic hydrocarbon or a chlorinated solvent or other non-reactive solvent such as chloroform, benzene and the like.

In order to illustrate the invention, extractions were conducted as follows:

100 ml. portions of the amine in kerosene were contacted once for two minutes with 3 ml. portions of aqueous acid in a separatory funnel. The amine concentration varied from 0.01 molar to 0.03 molar. The acid concentrations varied from 0.02 molar to 0.30 molar. All extractions were carried out in one stage. A 2.00 ml. aliquot of the acid was titrated with standard base before and after extraction.

The results of the acid extraction experiments are indicated in Tables I and II in which Amine A is a tertiary alkyl amine in which the alkyl groups are straight chain hydrocarbon groups having principally 8 and 10 carbon atoms with a minor amount of 12 carbon atoms which alkyl groups are derived from mixed $C_8$, $C_{10}$ and $C_{12}$ acids of coconut oil and Amine B is 1-dinonylamino-2-dodecanol.

TABLE I

*Extraction of HCl in presence of dodecylphenol*

| Amine | Dodecylphenol conc., M | K* |
|---|---|---|
| A | 0.00 | $1.0 \times 10^2$ |
|   | 0.05 | $4.0 \times 10^4$ |
|   | 0.10 | $14.0 \times 10^4$ |
| B | 0.00 | $2.0 \times 10^2$ |
|   | 0.05 | $1.5 \times 10^4$ |
|   | 0.10 | $6.0 \times 10^4$ |

*Activity coefficient, Harned, H. S. and Ehlers, R. W., J. Am. Chem. Soc., 55, 2179 (1933).

It is observed that the "K" value, and hence extraction of HCl is increased by the addition of the dodecylphenol and that this effect increases with the concentration of phenol.

TABLE II

*Extraction of $HNO_3$ by amine in presence of dodecylphenol*

| Amine | Dodecylphenol conc., M | K* |
|---|---|---|
| A | 0.00 | $2.0 \times 10^3$ |
|   | 0.05 | $7.0 \times 10^4$ |
|   | 0.10 | $17.0 \times 10^4$ |
| B | 0.00 | $1.0 \times 10^3$ |
|   | 0.05 | $3.0 \times 10^4$ |
|   | 0.10 | $10.0 \times 10^4$ |

*Activity coefficient based on Debye-Huckel theory, Allen, K. A., J. Phys. Chem., 64, 877 (1960).

In terms of percent, a 0.01 M solution of Amine A will extract 53% of a 0.09 M hydrochloric acid solution. In the presence of 0.05 M dodecylphenol 97% of the hydrochloric acid is extracted.

Another example is the extraction of sulfuric acid by these amines. The values of K [1] for the extraction of sulfuric acid by hydroxyamine in the absence and the presence of 0.05 M dodecylphenol are $2.1 \times 10^6$ and $9.0 \times 10^{10}$ respectively.

A 0.01 M solution of Amine A in kerosene will extract 28% of a .10 N $H_2SO_4$ solution. Addition of 0.05 M dodecylphenol will increase the extraction to 98%.

It is to be understood that the invention is not to be limited to the exact details of operation or the exact compounds shown and described as obvious modification and equivalents will be apparent to those skilled in the art and the invention is to be limited only by the scope of the appended claims.

The embodiments of the invention in which an exclusive property or privilege is claimed are defined as follows:

1. In a process for recovering inorganic mineral acids from an aqueous solution thereof wherein the said aqueous solution is contacted with a water immiscible organic phase comprising an amine extractant dissolved in a non-reactive organic solvent, the aqueous and organic phases are separated and the said acids are recovered from the organic phase, the improvement which comprises adding dodecylphenol to the water immiscible organic phase containing the amine extractant prior to the contacting of said organic phase with the said aqueous solution of the inorganic mineral acids.

2. A process as defined in claim 1 in which said amine is selected from the group consisting of secondary and tertiary amines.

3. A process as defined in claim 1 in which said amine is a secondary amine containing alkyl substituents each containing from 6 to 24 carbon atoms.

4. A process as defined in claim 1 in which said amine is a tertiary amine containing alkyl substituents each containing from 8 to 24 carbon atoms.

5. A process as defined in claim 1 in which said amine is 1-dinonylamino-2-dodecanol.

6. A process as defined in claim 1 in which said mineral acid is nitric acid.

7. A process as defined in claim 1 in which said mineral acid is sulfuric acid.

8. A process as defined in claim 1 in which said acid is hydrochloric acid.

References Cited by the Examiner

Coleman et al.: (Proceedings of International Conference on Peaceful Uses of Atomic Energy), photo copy, vol. 28, 1958, pages 278–288.

Crouse et al.: (Progress Report on Uranium Extraction With Organonitrogen Compounds), ORNL-2099, pages 2–10.

NORMAN YUDKOFF, *Primary Examiner.*

JAMES H. TAYMAN, *Examiner.*

[1] Activity coefficients from H. S. Harned and W. J. Hamer, J. Am. Chem. Soc., 57, 27 (1935).